United States Patent [19]

Fulbright et al.

[11] Patent Number: 4,576,495

[45] Date of Patent: Mar. 18, 1986

[54] DEPOSITORY/PRINTER MECHANISM FOR AN AUTOMATED TELLER MACHINE

[75] Inventors: Thomas G. Fulbright, Keller; G. Houson Payne, III, Carrollton, both of Tex.

[73] Assignee: Docutel/Olivetti Corporation, Irving, Tex.

[21] Appl. No.: 608,970

[22] Filed: May 10, 1984

[51] Int. Cl.$^4$ .......................... E05G 3/00; B41J 19/20
[52] U.S. Cl. ..................................... 400/328; 400/185; 109/24.1; 109/25; 109/46; 221/2; 232/47; 346/22
[58] Field of Search ............... 400/184, 185, 187, 320, 400/328, 578, 625, 626, 628, 646, 647, 647.1; 109/24.1, 25, 45, 46; 194/DIG. 8; 221/2; 222/23, 30; 232/47, 64, 65, 66; 346/22

[56] References Cited

U.S. PATENT DOCUMENTS

| | | | |
|---|---|---|---|
| 957,083 | 5/1910 | Nauck | 109/24.1 |
| 2,151,672 | 3/1939 | Ammann | 194/DIG. 8 |
| 2,604,967 | 7/1952 | Murtaugh, Jr. | 109/24.1 |
| 3,651,916 | 3/1972 | Becchi | 400/144.3 |
| 3,942,435 | 3/1976 | Aultz et al. | 109/25 |
| 4,050,569 | 9/1977 | Crump et al. | 400/320 |
| 4,386,564 | 6/1983 | Hirano et al. | 400/328 |
| 4,402,620 | 9/1983 | Kekas et al. | 400/320 |
| 4,444,521 | 4/1984 | Rickard et al. | 400/320 |

Primary Examiner—Edgar S. Burr
Assistant Examiner—David A. Wiecking
Attorney, Agent, or Firm—Harold E. Meier

[57] ABSTRACT

A depository/printer mechanism is provided for use with an automated teller machine (ATM). The mechanism includes an envelope tray for receiving a customer envelope to be deposited in a depository bin, a support assembly for supporting the envelope tray for movement between horizontal and vertical positions, and a printer frame secured to the support assembly. A printer carriage is also provided including a motor for reciprocating the printer carriage in the printer frame between a first position and a second position, and from the second position back to the first position. The printer carriage includes a printer module for printing indicia on the customer envelope. The printer carriage further includes several subassemblies; a drive assembly and a slide rod assembly for driving the printwheel against the customer envelope, and a pivot assembly for rotating the envelope tray from the horizontal position to the vertical position as the motor drives the printer carriage from the second position back to the first position. The depository/printer mechanism thus supports a stationary customer envelope during printing of indicia thereon by a single reciprocating printing carriage, thus obviating a costly and complex transport, control circuitry therefor and a plurality of printer modules.

18 Claims, 10 Drawing Figures

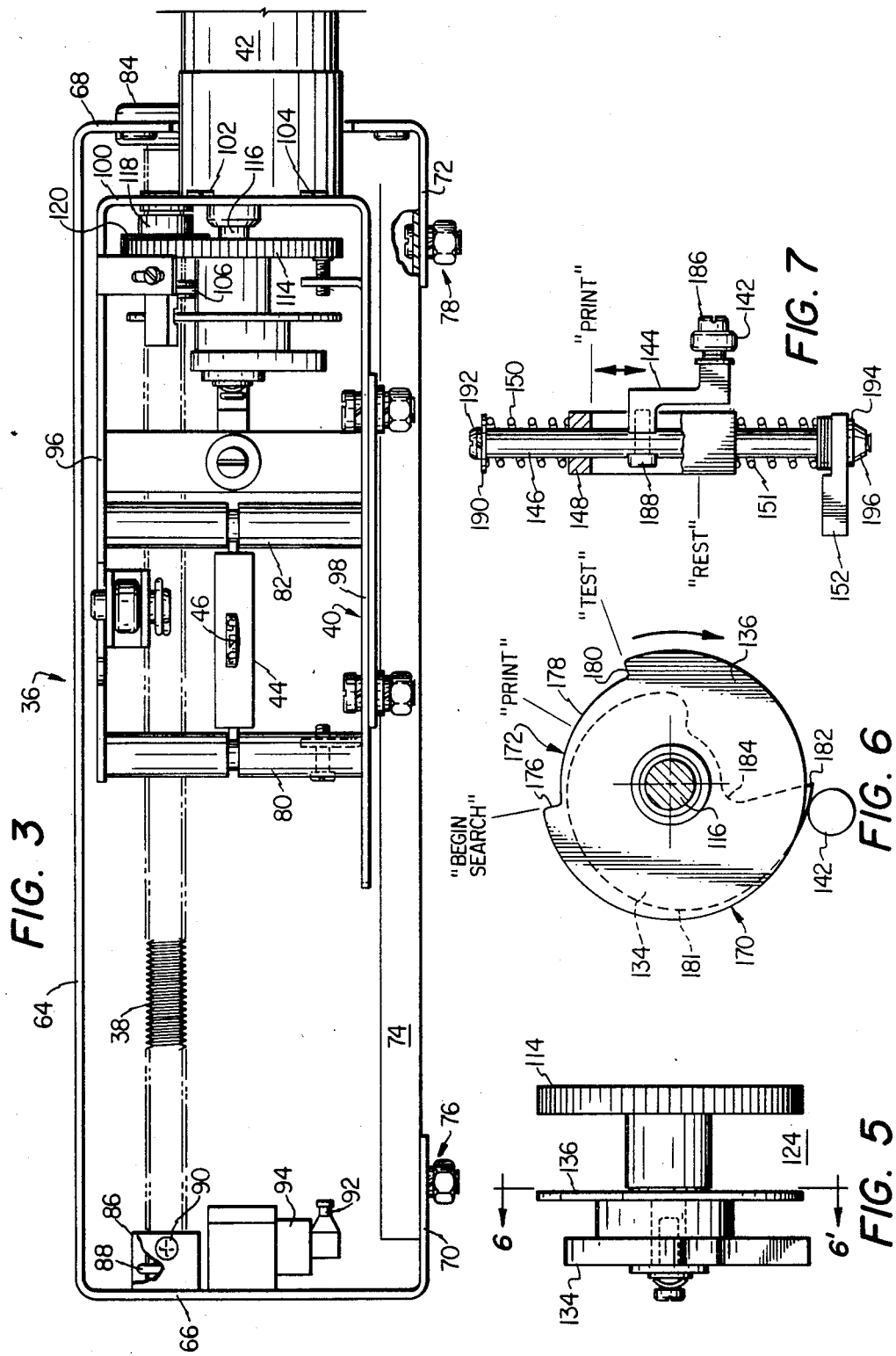

DEPOSITORY/PRINTER MECHANISM FOR AN AUTOMATED TELLER MACHINE

TECHNICAL FIELD

The present invention relates to a depository/printer mechanism for an automated teller machine (ATM) for receiving a customer deposit envelope, printing indicia thereon, and transferring this envelope to a depository.

BACKGROUND OF THE INVENTION

Automated teller machines (ATM's) having a depository/printer mechanism for receiving customer deposit envelopes are well-known in the prior art. These mechanism typically include a transport for transporting a deposited envelope to an ATM depository, and a plurality of coacting printer modules for printing sets of indicia on the envelope as it is moved along the transport mechanism. Such prior art depository/printer mechanisms are often costly and unreliable due to the requirement of a plurality of printer modules and control circuitry therefor, as well as the complex transport for transporting the deposited envelope. Moreover, because of the physical size of the transport, a depository/printer mechanism of the prior art cannot be utilized in ATM's having relatively small enclosure dimensions.

There is therefore a need for an improved depository/printer mechanism for an ATM which obviates the transport and the plurality of printer modules, and also which can be placed in a small ATM enclosure.

SUMMARY OF THE INVENTION

Accordingly, the present invention provides a depository/printer mechanism for an ATM wherein a deposited customer envelope is held stationary during printing of indicia thereon by a single reciprocating printer.

In the preferred embodiment, the depository/printer mechanism includes an envelope tray for receiving a customer envelope to be deposited in the depository, a support assembly for supporting the envelope tray for movement between horizontal and vertical positions, and a printer frame secured to the support assembly and having a lead screw. A printer carriage is also provided having a motor for reciprocating the printer carriage on the lead screw between a "home" position and a "full-forward" position. The printer carriage includes a printer for printing indicia on the envelope. The printer carriage further includes several subassemblies; a drive assembly and a slide rod assembly for driving the printer against the customer envelope, and a pivot assembly for rotating the envelope tray from the horizontal position to the vertical position as the motor drives the printer carriage back to the home position.

In operation, the ATM deposit cycle begins when a cardholder selects a deposit transaction and enters a dollar amount. After the deposit is processed by the ATM, a command is issued to unlock a depository door. Once the envelope is deposited in the envelope tray by the customer, the printer carriage motor is driven in a first direction to drive the printer carriage toward the full-forward position. During this movement, the printer is driven to print a predetermined number of characters on the stationary customer envelope. The printer carriage drives forward until the characters are printed, following which the motor is reversed and the printer carriage is driven back toward the home position. However, as the printer carriage moves back, the pivot assembly engages a barrel cam secured to the envelope tray to mechanically turn the tray to the vertical position, thereby allowing the customer envelope to fall into a depository bin associated with the ATM. The envelope tray is then spring-returned to the horizontal position to complete the deposit cycle.

BRIEF DESCRIPTION OF THE DRAWINGS

For a more complete understanding of the present invention and the advantages thereof, reference is now made to the following Description taken in conjunction with the accompanying drawings in which:

FIG. 3 is a top view of the printer frame of the depository/printer mechanism of FIG. 1 detailing the lead screw assembly for supporting a printer carriage;

FIG. 5 is a side view of a drive assembly of the printer carriage of FIG. 4;

FIG. 6 is a sectional view along lines 6—6' of FIG. 5 showing the details of a cam/encoder wheel assembly of the drive assembly;

FIG. 7 is a side view of the slide rod assembly of the printer carriage of FIG. 4, which in conjunction with the drive assembly of FIG. 5, drives a printer module against a customer envelope held in the envelope tray;

DETAILED DESCRIPTION

Figure 1:
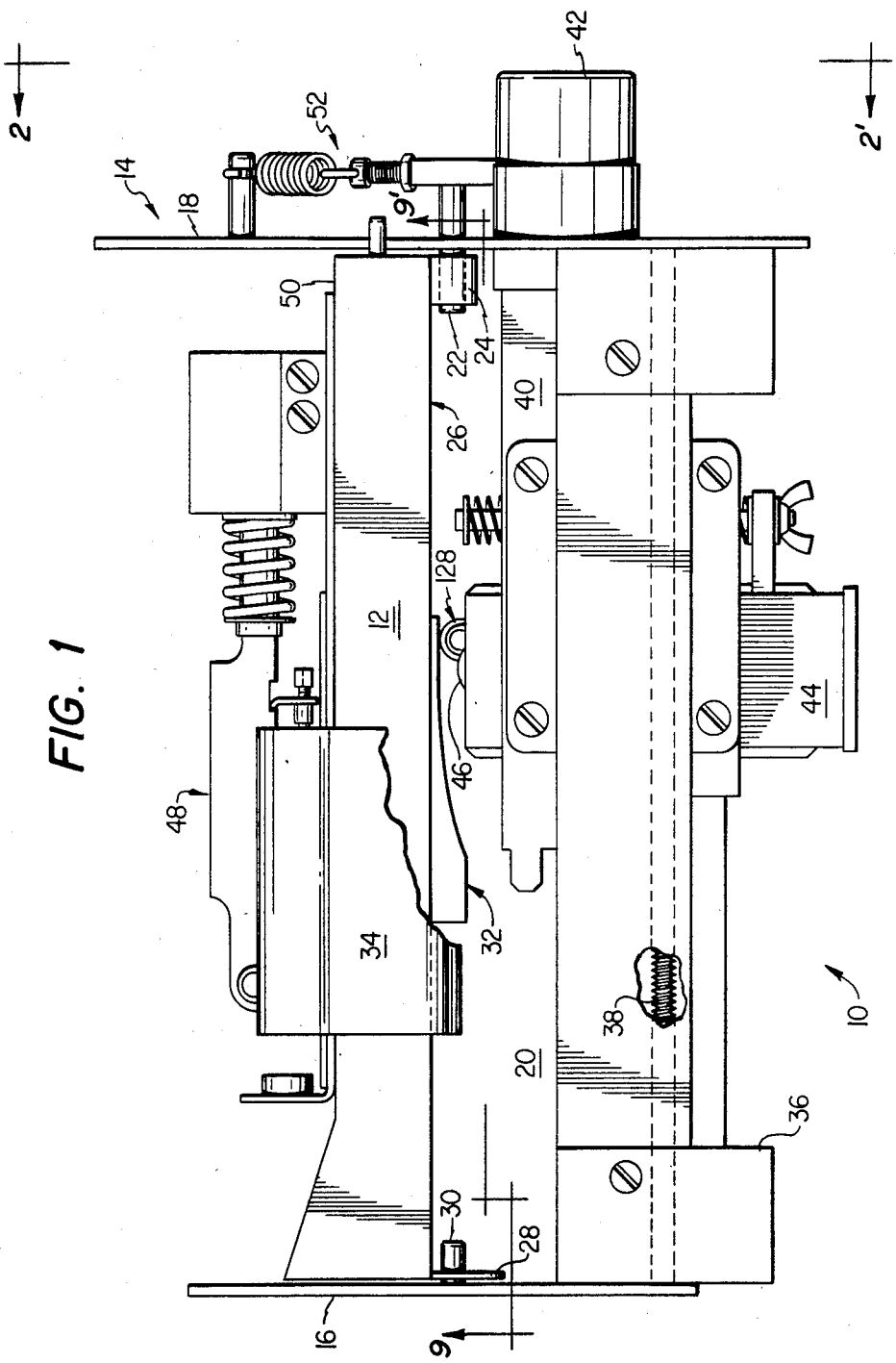
FIG. 1 is a side view of the depository/printer mechanism of the present invention for use in an automated teller machine (ATM)

With reference now to the FIGURES wherein like reference characters designate like or similar parts throughout the several views, FIG. 1 is a side view of the depository/printer mechanism 10 of the present invention for use in an automated teller machine (ATM). Generally, the depository/printer mechanism 10 operates to receive a customer deposit envelope, print indicia thereon, and deliver this envelope to a depository bin (not shown) associated with the ATM. To accomplish this operation, the depository/printer mechanism 10 includes an envelope tray 12 for receiving the customer envelope. The envelope tray 12 is supported by a support assembly 14 for movement between its horizontal position shown in FIG. 1, and a vertical position. Support assembly 14 includes a front plate 16 and a back plate 18 secured to a curve plate 20, which as will be described in more detail below, guides the movement of the envelope tray 12 between the horizontal and vertical positions.

The envelope tray 12 is supported by the support assembly 14 by a pivot pin 22 mounted in a pivot bar 24 secured to the bottom plate 26 of the envelope tray 12.

The envelope tray 12 also includes a front tab 28 which pivots about a pivot pin 30 secured to the front plate 16 of the support assembly 14. The envelope tray 12 further includes a barrel cam 32 welded to the bottom plate 26 thereof for controlling the movement of the envelope tray 12 between the horizontal and vertical positions.

As also seen in FIG. 1, the envelope tray 12 further includes a bracket 34 for supporting an ink cartridge (not shown), the ink cartridge supplying ink to a printer of the mechanism. In particular, the depository/printer mechanism includes a printer frame 36 secured between the front and back plates, 16 and 18, respectively, of the support assembly 14. As will be described in more detail below, the printer frame 36 includes a lead screw 38 upon which a printer carriage 40 reciprocates between a first, "home", position and a second, "full-forward" position. In the first position, the printer carriage 40 abuts the front plate 16 of the support assembly 14, while in the second position, the printer carriage 40 abuts the rear plate 18.

Referring back to FIG. 1, the printer carriage 40 includes a motor 42 for reciprocating the printer carriage on the lead screw 38 back and forth between the first and second positions. The printer carriage also includes a printer module 44 having a printwheel 46 for printing indicia on the customer envelope placed in the envelope tray 12. In particular, the bottom plate 26 of the envelope tray 12 includes an aperture (not shown) through which the printwheel 46 of the printer module 44 is driven to print indicia on the customer envelope. The depository/printer mechanism 10 further includes a platen assembly 48 secured to a top plate 50 of the envelope tray 12 for holding the customer envelope against the bottom plate 26 thereof during this printing operation.

The depository/printer mechanism of FIG. 1 is designed to receive a customer envelope and deliver this envelope to a depository bin associated with the ATM. Generally, a customer deposit cycle begins when a cardholder selects a deposit transaction and enters a dollar amount. Once the deposit transaction is processed, the cardholder opens the depository's door and inserts a customer envelope into the envelope tray 12. Thereafter, the ATM issues commands to first engage the platen assembly 48 to hold the customer envelope against the bottom plate 26 of the envelope tray. The motor 42 of the printer carriage 40 is then engaged to drive the printer carriage along the lead screw 38 of the printer frame 36.

During reciprocation of the printer carriage between the front and back plates 16 and 18 of the support assembly 14, the printwheel 46 is driven, as will be described, to print preferably twenty characters on the envelope. The printer carriage 40 drives forward toward the back plate 18 until the twentieth character is printed. Thereafter, the drive motor 42 is reversed and the printer carriage is driven back toward its home position. However, during this return cycle a roller of a one-way pivot assembly 128, to be described below, operates with the barrel cam 32 to mechanically turn the envelope tray 12 between the horizontal and vertical positions. In addition, during the return-home cycle the platen assembly 48 is disengaged, thereby allowing the customer envelope to fall into a depository bin as the envelope tray is moved to the vertical position. After the customer envelope falls from the envelope tray, the tray is spring-returned to the horizontal position by a return mechanism, represented generally by the reference numeral 52 in FIG. 1.

Figure 2:
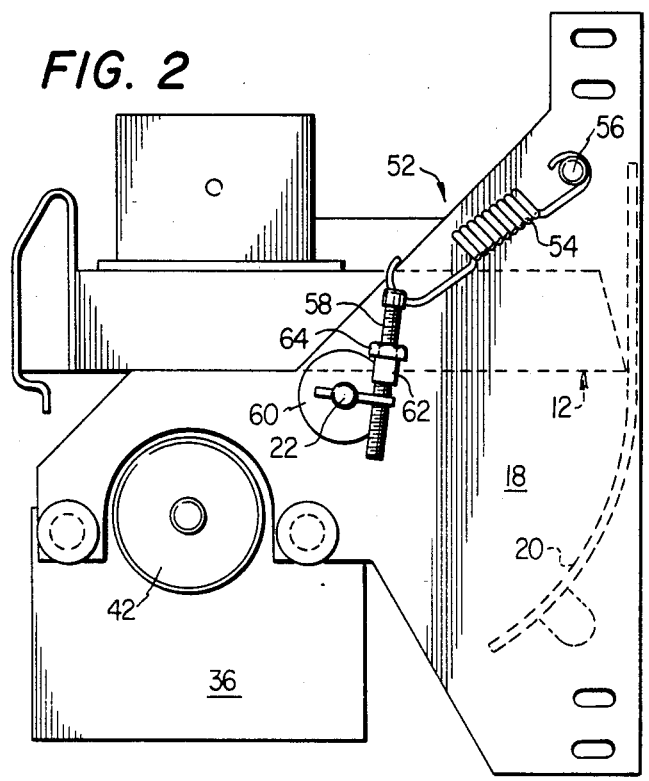
FIG. 2 is a rear view of the depository/printer mechanism of FIG. 1 showing the structure of the support assembly thereof.

Referring now to FIG. 2, a rear view of the depository/printer mechanism along lines 2—2' of FIG. 1 is shown. As can be seen in FIG. 2, the rear plate 18 of the support assembly 14 has a generally triangular shape. FIG. 2 also shows the structure of the curve plate 20 of the support assembly 14 for guiding the movement of the envelope tray between the horizontal and vertical positions. As also discussed above, a return mechanism 52 is provided to spring-return the envelope tray back to the horizontal position. The return mechanism 52 includes a spring 54, an end of which is secured to a spring anchor 56 attached to the rear plate 18 of the support assembly 14. The other end of the spring 54 is attached to the head of a screw pivot 58 attached to a shaft clamp 60. The shaft clamp 60 is secured to the pivot pin 22 of the envelope tray as best seen in FIG. 1. The shaft clamp 60 includes a cutout portion for receiving a spacer 62 and hex nut 64 threaded around the screw pivot 58. This structure serves to return the envelope tray 12 back to the horizontal position of FIG. 1 following the depositing of the customer envelope in the depository bin.

Referring now to FIG. 3, a top view of the printer frame 36 is shown in detail. As can be seen in this view, the printer frame 36 comprises an elongated side plate 64, front and back plates 66 and 68, respectively, and face plates 70 and 72. The plates 64–72 are integrally-formed in a unitary structure. The printer frame 36 includes a carriage supporting slide assembly 74 secured to the face plates 70 and 72 by the screw assemblies 76 and 78, respectively. The printer carriage 40 also includes guides 80 and 82 for guiding the movement of the printer module 44.

As discussed above, the printer frame 36 includes a lead screw 38 upon which the printer frame reciprocates between a "home" position adjacent front plate 66, and a "full-forward" position adjacent back plate 68. In particular, one end of the lead screw 38 is mounted in the printer frame 36 through a rubber grommet 84. The other end of the lead screw 38 is supported in a bracket 86 welded to an inner wall of the front plate 66. An o-ring 88 and screw 90 are used to prevent rotation of the lead screw 38. The printer frame 36 also includes a pair of switches for indicating when the printer carriage is at the first or second positions. In particular, snap action switch 92 is secured to a switch bracket 94 and is actuated when the printer carriage 40 returns to the "home" position. A similar snap action switch (not shown) is mounted below the printer carriage 40 in FIG. 3 and is actuated when the printer carriage has been driven to the "full-foward" position to print preferably twenty characters on the customer envelope.

FIG. 3 also discloses the support structure for mounting the printer carriage 40 to the lead screw 38. As seen in this view, the printer carriage 40 has a generally u-shaped structure comprising the side plates 96 and 98, and the back plate 100. Plates 96–100 are integrally-formed in a unitary structure. As seen in FIG. 3, the motor 42 is mounted in the back plate 100 by the screws 102 and 104. As also seen in this view, bearing 106 is punched from the side plate 96, and includes an aperture through which the lead screw 38 passes. The back plate 100 of the printer carriage 40 also includes an aperture (not shown) through which the lead screw 38 passes. To drive the printer carriage 40 with respect to the lead screw 38, the printer carriage includes a drive gear 114 driven by the motor through a connecting shaft 116. A nut 118 is threaded around the lead screw 38 and includes a gear 120 molded on the outer peripheral surface thereof. In operation, the teeth of the gear 120 mesh with the teeth of the drive gear 114 to enable the motor 42 to drive the printer carriage 40 along the lead screw 38.

Figure 4:
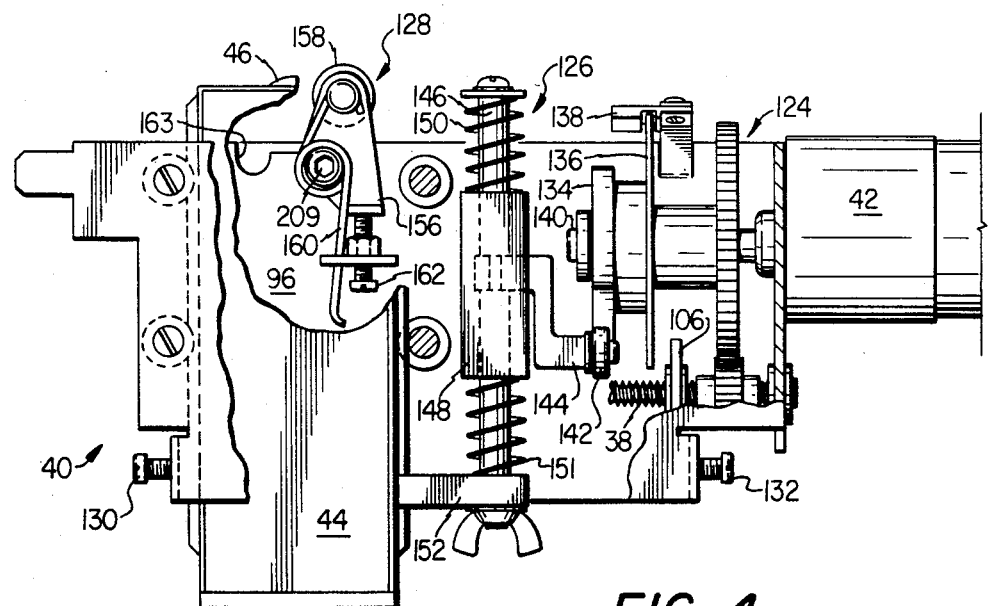
FIG. 4 is a side view showing the details of the printer carriage supported in the printer frame of FIG. 3.

Referring now to FIG. 4, a side view is shown of the printer carriage 40 utilized in the depository/printer mechanism 10 of the present invention. The printer carriage 40 includes several subassemblies, including a drive assembly 124, a slide rod assembly 126 and a pivot assembly 128. This view also shows the bearing 106 which is used to accept support from the lead screw 38 as discussed above with respect to FIG. 3. As also seen in FIG. 4, the printer carriage includes screws 130 and 132 for engaging the snap action electric switches, such as the switch 92 in FIG. 3.

The printer carriage 40 further includes a conventional printer module 44 having the single printwheel 46 for printing indicia on a customer envelope. Preferably, the printer module is of the type manufactured by Hecon Corp. Model No. 30. The drive assembly 124 and the slide rod assembly 126 are provided for driving the printer module 44 and thus the printwheel 46 against the customer envelope held in the envelope tray. As discussed above with respect to FIG. 1, the customer envelope is held against the bottom plate 26 of the envelope tray 12 by the platen assembly 48 as the printer carriage 40 reciprocates between its home and full-forward positions.

Referring back to FIG. 4, drive assembly 124 includes a cam/encoder wheel assembly having a cam 134, encoder wheel 136 and an optical detector 138. The optical detector 138 preferably includes a light emitting diode (LED) and a phototransistor detector (not shown) for receiving the infrared radiation produced by the LED. As will be described below, the encoder wheel 136 serves to selectively block the radiation from the LED during certain portions of the cam 134 rotation. The cam and encoder wheel are secured to the connecting shaft 116 of the motor 42 by the screw assembly 140.

As also seen in FIG. 4, the slide rod assembly 126 includes a cam follower 142 for engaging the cam 134 of the drive assembly 124. The cam follower 142 is mounted to a z-shaped arm 144 which is in turn secured to a slide rod 146 mounted in a slide block 148. Slide rod assembly 126 also includes two springs 150 and 151 for biasing the slide rod 146 for movement between a print position and a rest position. As will be described in more detail below, the slide rod assembly further includes a printer arm 152 for engaging a bottom end of the printer module 44 to drive the module 44 against the underside of the customer envelope. Specifically, as the cam 134 of the drive assembly 124 drives the cam follower 142 of the slide rod assembly 126, the slide rod 146 is driven down, thereby compressing the spring 150. Continued rotation of the cam 134 allows expansion of the spring 150, thereby driving the printwheel 46 of the printer module against the underside of the customer envelope in the envelope tray 12.

As also seen in FIG. 4, the printer carriage 40 further includes the pivot assembly 128 which in conjunction with the barrel cam 32 in FIG. 1 facilitates the rotation of the envelope tray 12 as the printer carriage 40 is driven back toward the "home" position. The pivot assembly 128 includes a u-shaped pivot bracket 156 for supporting a roller 158 that engages the barrel cam 32. The pivot assembly 128 further includes a spring 160 which serves to bias the pivot bracket 156 and the roller 158 against the barrel cam 32 during portions of the printer carriage movement. The spring 160 tries to rotate the pivot assembly 128 in a clockwise direction; however, the assembly includes a stop screw 162 for preventing such clockwise rotation as will be described in more detail below.

In operation, when the printer carriage 40 moves toward the full-forward position as discussed above with respect to FIG. 3, the roller 158 is recessed in a notch 163 located in the side plate 96 of the printer carriage 40. However, when the motor 42 drives the printer carriage 40 back to the "home" position following printing of indicia on the customer envelope, the roller 158, which is now in the extended position of FIG. 4, follows the barrel cam 32 to rotate the envelope tray from the horizontal position to the vertical position. This rotation causes the customer envelope to fall from the envelope tray 12 into a depository bin associated with the automated teller machine.

Referring now to FIG. 5, a detailed view is shown of the drive assembly 124 of FIG. 4. This view shows the drive gear 114, which as discussed above with respect to FIG. 3, engages the gear 120 of the printer frame 36 to drive the printer carriage 40 between the home and full-forward positions. The drive assembly 124 also includes the encoder wheel 136 for controlling the movement of the printwheel 46 of the printer module 44, and the cam 134 for driving the slide rod assembly 126. The cam 134, encoder wheel 136 and drive gear 114 are secured to the connecting shaft 116 of the motor 42 by the screw assembly 140. Further, although not shown in detail in FIG. 5 the drive assembly 124 also includes a slip clutch for preventing rotation of the cam 134 as the printer carriage 40 returns to the home position; i.e., when the drive motor 42 reverses.

Referring now to FIG. 6, a sectional view along lines 6—6' of FIG. 5 is shown. As seen in FIG. 6, the encoder wheel 136 includes first and second sections represented generally by the reference numerals 170 and 172. The first section 170 of the encoder wheel 136 serves to block infrared radiation from the light emitting diode of the optical detector 138 during a "search" portion of a print cycle, while the second section 172 allows the infrared radiation to be received by the phototransistor in the detector 138 during a "print" portion of the print cycle. In particular, the second section 172 of the encoder wheel 136 has a smaller outer diameter (OD) than the outer diameter of the first section 170 to allow infrared radiation to be detected during the print cycle as the assembly rotates in a clockwise direction.

In operation, a first edge 176 of the second section 172 defines the beginning of the "search" portion of the print cycle. During this search portion, the printwheel 46 of the printer module 44 is rotated to a new character of a 20-digit character print table printed on the customer envelope by the mechanism. Referring simultaneously to FIGS. 4 and 6, during the search portion the cam follower 142 follows the cam 134 thus allowing the slide row assembly 126 to be actuated into a "cocked" position; i.e., the position just prior to actuation of the printer module against the envelope.

As also seen in FIG. 6, an edge 180 of the second section 172 determines the end of the search portion of the print cycle. When the edge 180 passes the optical detector, a test is made to determine whether the next character to be printed has been found. If so, i.e. if the printwheel 46 is in the proper position, the motor 42 continues to drive the cam 134, causing the cam follower 142 to pass an edge 182 thereof and fall to the print surface 184. The slide rod assembly 126 is thus activated to the print position to drive the printer module 44 against the customer envelope. However, if the next character has not been found when the edge 180 passes through the optical detector 138, the motor 42 is stopped until this character is found. Once found, the motor 42 is restarted and the character printed as described above. As seen in FIG. 6, the impact of the printwheel 46 against the bottom of the customer envelope 12 occurs at approximately the mid portion 178 of the second section 172.

It should be appreciated that although not shown or described in detail, the depository/printer mechanism of the present invention is controlled by a suitable microprocessor-based control system. Such a system includes various software routines for controlling the operation of the cam/encoder wheel assembly as discussed above with respect to FIG. 6, as well as the overall operation of the mechanism components.

Referring now to FIG. 7, the details of the slide rod assembly 126 of FIG. 4 are shown. Specifically, the slide rod assembly 126 includes the cam follower 142 mounted to the z-shaped arm 144 by the screw 186. As discussed above with respect to FIG. 6, the cam follower 142 tracks the cam 134 of the drive assembly to control the actuation of the printer module 44. In particular, the cam follower 142 drives the z-shaped arm 144 secured to the slide rod 146. As seen in FIG. 7, the slide rod 146 includes an aperture therein for receiving a screw assembly 188 which secures the z-shaped arm 144 to the slide rod. The slide rod 146 is mounted for reciprocal movement between a rest and print position within the slide block 148. The block 148 is secured to the side plates 96 and 98 of the printer carriage 40. The slide rod assembly 126 also includes the springs 150 and 151 to bias the slide rod 146 for movement between the rest and print position. To this end, the top end of the slide rod 146 includes a washer 190 secured thereto by the screw 192. The washer 192 serves to limit the movement of the spring 150. The other end of the slide rod 146 includes the printer arm 152 secured thereto by the washer 194 and the nut 196.

Referring simultaneously to FIGS. 6 and 7, the operation of the slide rod assembly can be seen. In particular, when the cam follower 142 follows an outer surface 181 of the cam 134, the slide rod 146 approaches the fully cocked position. As the cam follower turns edge 182 of the cam 134 and drops to the print surface 184 thereof, the z-shaped arm 144 is driven toward the top 198 of the slide block 148, thereby actuating the slide rod 146 toward the print position. Accordingly, the printer arm 142 drives the printer module 44 against the underside of the customer envelope to print a character thereon. Following the printing of a character, the cam follower 144 again follows the outer surface 181 of cam 134 while the printwheel 46 is moved to a new character. During this search portion, the slide rod assembly is again cocked for the next release.

Figure 8:
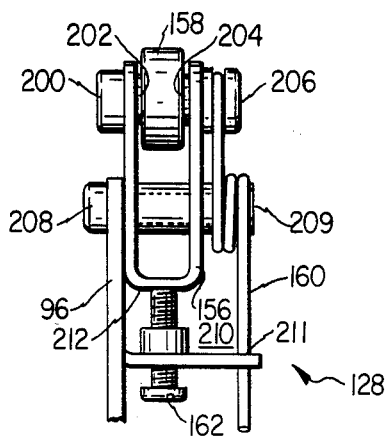
FIG. 8 is a side view of the pivot assembly of the printer carriage of FIG. 4 for controlling the movement of the envelope tray between horizontal and vertical positions.

Referring now to FIG. 8, the details of the pivot assembly 128 of FIG. 4 are shown. As discussed generally above, the pivot assembly 128 operates in conjunction with the barrel cam 32 secured to the bottom plate 26 of the envelope tray 12 for rotating the envelope tray as the printer carriage drives back to the "home" position. This rotation causes the customer envelope to fall from the envelope tray 12 into a depository bin associated with the ATM. As seen in FIG. 8, the pivot assembly 128 includes a u-shaped pivot bracket 156 for supporting the roller 158 that engages the barrel cam. A screw 200 is threaded between the ends of the pivot bracket 156 and supports first and second insulating washer 202 and 204 upon which the roller 158 is mounted. A screw 206 secures the roller 158 and washers 202 and 204 to the pivot bracket 156. As also seen in FIG. 8, a molded insulator 208 is secured to the pivot bracket 156 for allowing free rotation of the pivot assembly about a mounting screw 209.

Referring simultaneously to FIGS. 4 and 8, the pivot assembly also includes the stop screw 162 which is mounted in a stop assembly 210. The assembly 210 also receives one end of the spring 160 in aperture 211, the other end thereof being secured around the screw 206. As seen in FIG. 4, the mounting screw 209 is offset vertically with respect to the roller 158 to guarantee that a vertical load on the roller 158 tries to rotate the pivot assembly 128 in the clockwise direction.

In operation of the pivot assembly 128 of FIG. 8, when the printer carriage 40 moves toward the full-forward position during the print cycle, the pivot bracket 156 and the roller 158 are in a collapsed position in notch 163 over the vertical offset. Therefore, the envelope tray 12 remains in the horizontal position. However, when the printer carriage returns toward the "home" position, the roller 158 engages the barrel cam 32, thus forcing a bottom edge 212 of the pivot bracket 156 against the stop screw 162. Because the stop assembly 210 prevents clockwise rotation of the pivot bracket 156, the roller 158 follows the barrel cam 32 to move the envelope tray to the vertical position, thereby dropping the customer envelope into a depository bin associated with the ATM. Once the roller 158 clears the barrel cam surface, the envelope tray is spring returned to the horizontal position by the spring return mechanism 52 as discussed above with respect to FIG. 1.

Figure 9:
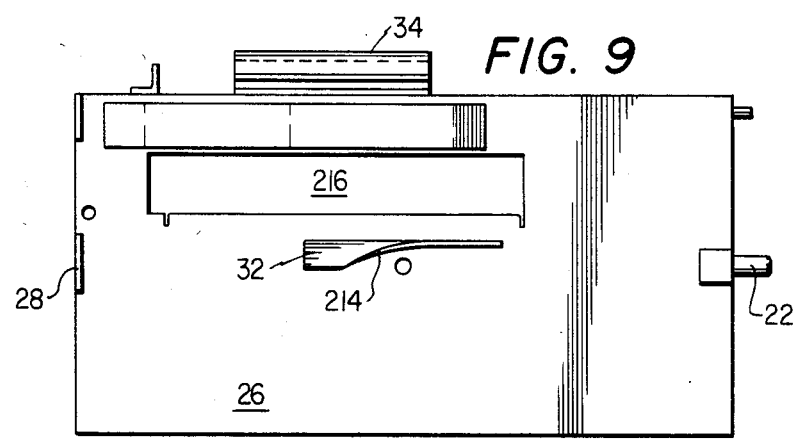
FIG. 9 is a bottom view of the customer envelope tray along lines 9—9' of FIG. 1.

Referring now to FIG. 9, the bottom plate 26 of the envelope tray 12 is shown in detail. As seen in FIG. 9, the barrel cam includes a curved surface 214 which the roller 158 of the pivot assembly 128 follows during the movement of the printer carriage back to the home position. FIG. 9 also shows the aperture 216 in the bottom plate 26 of the envelope tray 12 through which the printer module 44 is driven. As noted above, the printwheel contacts an ink cartridge ribbon which in turn contacts the bottom of the customer envelope to print indicia.

Figure 10:
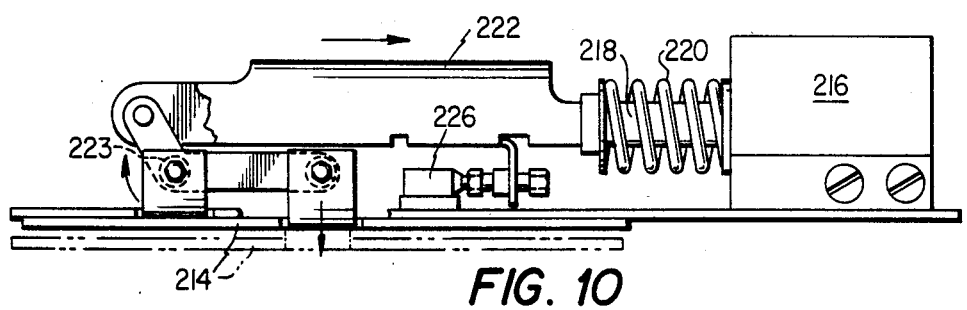
FIG. 10 is an elevational view showing the platen assembly of FIG. 1 for holding the customer envelope during printing.

Referring now to FIG. 10, the platen assembly 48 for securing the customer envelope 12 against the bottom plate 26 of the envelope tray 12 is shown. In particular, the platen assembly 48 includes a platen pad 214 which is driven (as shown in phantom) against the customer envelope through actuation of the solenoid 216. The solenoid 216 includes a plunger 218 and spring 220 for driving a pull link 222. Translational movement of the pull link 222 is transferred to a pivot link 223 attached to the platen pad 214 to drive the pad against the customer envelope upon initiation of the print cycle. A snap action switch 226 is used to indicate that the pad 24 has returned to its rest position as the envelope tray is rotated to the vertical position.

Summarizing the operation of the depository/printer mechanism of the present invention, the deposit cycle begins when the ATM user selects a deposit transaction and enters a dollar amount. Following the issuance by the ATM of a "process deposit" command, and the determination of a 20-digit character print table to be printed on the customer envelope, a depository door-unlock command sequence is initiated by the control device associated with the ATM. Following the opening of the depository door and insertion of the customer envelope by the cardholder, the platen assembly is engaged to initiate the print cycle. The printer carriage is then driven on the lead screw of the printer frame between the "home" position and the "full-forward" position. Simultaneously, the drive assembly and the slide rod assembly cause the printer module to print twenty characters on the customer envelope. The printer carriage drives forward until the twentieth character is printed, thereafter the drive motor is reversed and the printer carriage is driven back toward the "home" position. However, during this return the pivot assembly is engaged to enable the barrel cam to mechanically turn the envelope tray. In addition, the platen assembly is disengaged; thereby allowing the customer envelope to fall into a depository bin as the envelope tray is moved to the vertical position. Once the printer carriage passes the barrel cam, the envelope tray is spring-returned to the horizontal position to receive another deposit.

The depository/printer mechanism of the present invention overcomes several problems associated with prior art mechanism. In particular, such prior art mechanisms typically include a transport for transporting a deposited envelope to an ATM depository bin, and a plurality of coacting printer modules for printing sets of indicia on the envelope as it is moved along the transport. These mechanisms are often costly and impractical due to the need for a plurality of printer modules and control circuitry therefor, as well as the requirement of a complex transport for transporting the deposited envelope. Moreover, because of the physical size of the transport a depository/printer mechanism of the prior art cannot be utilized in ATM's having relatively small enclosure dimensions.

The depository/mechanism of the present invention overcomes these and other problems of the prior art by providing a mechanism wherein the deposited envelope is held stationary during printing of indicia thereon by a single reciprocating printer module. Thus in contradistinction to prior art depository/printer mechanisms, the costly and complex transport and plurality of printer modules are not required. Accordingly, the depository/printer mechanism of the present invention can be placed in a small ATM enclosure, and is much less costly and more reliable than such prior art mechanisms.

Those skilled in the art will appreciate that the depository/printer mechanism of the present invention may include other features to facilitate the movement of the customer envelope to the depository bin associated with the ATM. In particular, a roller assembly may be provided adjacent the platen assembly for engaging the customer envelope as it is placed in the envelope tray by the ATM user. This roller assembly ensures that the customer envelope is quickly and properly placed in the envelope tray before the print cycle is initiated.

Although the invention has been described and illustrated in detail, it is to be clearly understood that the same is by way of illustration and example only and is not to be taken by way of limitation. The spirit and scope of this invention are to be limited only by the terms of the appended claims.

We claim:

1. A depository/printer mechanism for an automated teller machine (ATM) having a depository bin, comprising:
   an envelope tray means for receiving a customer envelope to be deposited in the depository bin;
   a support assembly means for supporting said envelope tray means for rotation between a horizontal position and a vertical position;
   a printer frame secured to said support assembly means and including a lead screw;
   a printer carriage having a motor means for reciprocating said printer carriage on said lead screw between a first position and a second position, and from said second position back to said first position, said printer carriage further including:
      a printer means having a printwheel for printing indicia on said envelope; and
      drive means connected to said motor means for driving said printwheel against said envelope as said printer carriage reciprocates on said lead screw between said first and second positions; and
   means supported by the printer carriage and the envelope tray means for rotating said envelope tray means from said horizontal position to said vertical position to thereby deposit the customer envelope in the depository bin as said motor means drives said printer carriage from said second position back to said first position following printing of said indicia.

2. The depository/printer mechanism as described in claim 1 further including means for holding said envelope in said envelope tray means as said printer carriage reciprocates between said first and second positions.

3. The depository/printer mechanism as described in claim 1 wherein said means for rotating said envelope tray means from said horizontal position to said vertical position includes a pivot assembly secured to said printer carriage, and a barrel cam secured to an underside of said envelope tray means.

4. The depository/printer mechanism as described in claim 3 wherein said pivot assembly includes a u-shaped pivot bracket for supporting a roller for engaging said barrel cam.

5. The depository/printer mechanism as described in claim 4 wherein said pivot assembly further includes means for preventing said u-shaped pivot bracket from rotating when said roller engages said barrel cam during movement of said printer carriage from said second position to said first position.

6. The depository/printer mechanism as described in claim 5 wherein said pivot assembly further includes a spring means for biasing said pivot bracket and said roller against said means for preventing rotation.

7. The depository/printer mechanism as described in claim 1 wherein said support assembly includes a curve plate means for guiding the movement of said envelope tray between said horizontal and vertical positions.

8. The depository/printer mechanism as described in claim 7 further including means for returning said envelope tray means to said horizontal position after said printer carriage returns back to said first position.

9. The depository/printer mechanism as described in claim 8 wherein said means for returning includes a spring secured between said support assembly and said envelope tray means.

10. The depository/printer mechanism as described in claim 1 wherein said drive means of said printer carriage includes a drive assembly and a slide rod assembly for driving said printwheel of said printer against said envelope.

11. The depository/printer mechanism as described in claim 10 wherein said drive assembly includes a drive gear connected to said motor means, and a cam/encoder wheel assembly having a cam and an encoder wheel.

12. The depository/printer mechanism as described in claim 1 wherein said drive assembly further includes an optical detector having an LED and a phototransistor.

13. The depository/printer mechanism as described in claim 12 wherein said encoder wheel includes first and second sections, said first section serving to block infrared radiation from said LED during a "search portion" of a print cycle, said second section allowing said infrared radiation to be received by said phototransistor during a "print portion" of said print cycle.

14. The depository/printer mechanism as described in claim 11 wherein said slide rod assembly includes a cam follower connected to a z-shaped arm, said cam follower engaging said cam of said drive assembly.

15. The depository/printer mechanism as described in claim 14 wherein said slide rod assembly further includes a slide rod having a slide block mounted thereon for reciprocation, said cam follower secured to said slide rod.

16. The depository/printer mechanism as described in claim 15 wherein said slide rod assembly further includes a printer arm connected at a bottom end of said slide rod and engaged into said printer means.

17. A depository/printer mechanism for an automated teller machine (ATM) having a depository bin, comprising:
an envelope tray means for receiving a customer envelope to be deposited in the depository bin, said envelope tray means including a barrel cam secured to an underside thereof;
a support assembly means for supporting said envelope tray means for rotation between a horizontal position and a vertical position;
a printer frame secured to said support assembly means and including a lead screw;
a printer carriage having a motor means for reciprocating said printer carriage on said lead screw between a first position and a second position, and from said second position back to said first position, said printer carriage further including;
a printer means having a printwheel for printing indicia on said envelope; and
drive means including a drive assembly and a slide rod assembly for driving said printwheel against said envelope as said printer carriage reciprocates on said lead screw between said first and second positions;
a pivot assembly secured to said printer carriage, said pivot assembly in conjunction with said barrel cam serving to rotate said envelope tray means from said horizontal position to said vertical position as said motor means drives said printer carriage from said second position back to said first position following printing of said indicia; and
a spring means, secured between said support assembly means and said envelope tray means, for returning said envelope tray to said horizontal position after said printer carriage returns back to said first position.

18. A depository/printer mechanism for an automated teller machine (ATM) having a depository bin, comprising:
an envelope tray means for receiving a customer envelope to be deposited in the depository bin, said envelope tray means having a barrel cam secured to an underside thereof;
a support assembly means for supporting said envelope tray means for rotation between a horizontal position and a vertical position;
a printer frame secured to said support assembly means and including a lead screw;
a printer carriage having a motor means for reciprocating said printer carriage on said lead screw between a first position and a second position, and from said second position back to said first position, said printer carriage further including:
a printer means having a printwheel for printing indicia on said envelope;
a drive assembly having a drive gear connected to said motor means, and a cam/encoder wheel assembly having a cam and an encoder wheel; and
a slide rod assembly including a cam follower connected to a z-shaped arm, said cam follower engaging said cam of said drive assembly, said slide rod assembly further including a slide rod having a slide block mounted thereon for reciprocation, said cam follower secured to said slide rod,
said slide rod assembly further including a printer arm means connected at a bottom end of said slide rod and engaged into said printer means for driving said printwheel against said envelope as said printer carriage reciprocates on said lead screw between said first and second positions;
a pivot assembly means secured to said printer carriage, said pivot assembly means operating in conjunction with said barrel cam for rotating said envelope tray means from said horizontal position to said vertical position as said motor means drives said printer carriage from said second position back to said first position following printing of said indicia;
a spring means, secured between said support assembly means and said envelope tray means for returning said envelope tray means to said horizontal position after said printer carriage returns back to said first position; and
a platen assembly means for holding said envelope in said envelope tray means as said printer carriage reciprocates between said first and second positions.

* * * * *